(12) United States Patent
Busser

(10) Patent No.: US 6,523,087 B2
(45) Date of Patent: Feb. 18, 2003

(54) UTILIZING PARITY CACHING AND PARITY LOGGING WHILE CLOSING THE RAID5 WRITE HOLE

(75) Inventor: Richard W. Busser, Longmont, CO (US)

(73) Assignee: Chaparral Network Storage, Inc., Longmont, CO (US)

( * ) Notice: Subject to any disclaimer, the term of this patent is extended or adjusted under 35 U.S.C. 154(b) by 0 days.

(21) Appl. No.: 09/799,480

(22) Filed: Mar. 6, 2001

(65) Prior Publication Data

US 2002/0161970 A1 Oct. 31, 2002

(51) Int. Cl.$^7$ .............................................. G06F 12/16
(52) U.S. Cl. ........................ 711/114; 711/113; 711/161; 711/162; 714/6; 714/20
(58) Field of Search ................................ 711/113, 114, 711/169, 161, 162; 714/6, 20

(56) References Cited

U.S. PATENT DOCUMENTS

| | | | |
|---|---|---|---|
| 5,574,882 A | | 11/1996 | Menon et al. ............... 395/441 |
| 5,774,643 A | * | 6/1998 | Lubbers et al. ............... 714/20 |
| 5,819,109 A | * | 10/1998 | Davis ........................... 710/15 |
| 5,860,090 A | | 1/1999 | Clark ........................... 711/113 |
| 6,067,635 A | | 5/2000 | DeKoning et al. ............. 714/6 |
| 6,148,368 A | * | 11/2000 | DeKoning ................... 711/113 |

* cited by examiner

Primary Examiner—Do Hyun Yoo
Assistant Examiner—Jasmine Song
(74) Attorney, Agent, or Firm—Sheridan Ross P.C.

(57) ABSTRACT

A method for enhancing the performance on non-full stripe writes while closing the RAID5 write hole is disclosed. When a RAID controller receives data to be written to a disk array, the controller stores the data in nonvolatile memory, and opens a write operation. When the current write operation is initiated, the controller reads the old data from the disk array and checks for cached parity that corresponds to the stripe of data that is to be modified. If the parity is cached, the controller reads the cached parity, and if the parity is not cached, the controller reads the old parity from the disk array. New parity is then computed. If the parity was cached, the controller will modify a parity log to show an outstanding data write. If the parity was not cached, the controller will open a parity log to show an outstanding data and parity write. The new parity is then cached in nonvolatile memory. The controller then determines whether the following write operation is for the same stripe of data. If the following write operation is for the same stripe, the controller writes the new data to disk and opens a parity log for the following write operation to show an outstanding parity write, and terminates the current write operation. If the following write operation is not for the same stripe, the controller writes both the new data and new parity to disk, and terminates the current write operation.

24 Claims, 4 Drawing Sheets

Performing a Data Write Without Using A Log Or Cache
(Prior Art)

UTILIZING PARITY CACHING AND PARITY LOGGING WHILE CLOSING THE RAID5 WRITE HOLE

FIELD OF THE INVENTION

The present invention relates to performance enhancements for RAID storage systems and more particularly to a method and system for enhancing performance of non-full stripe writes by utilizing parity caching and parity logging.

BACKGROUND OF THE INVENTION

A typical data processing system generally involves one or more storage units which are connected to a host computer either directly or through a control unit and a channel. The function of the storage units is to store data and other information (e.g., program code) which the host computer uses in performing particular data processing tasks.

Various types of storage units are used in current data processing systems. A typical system may include one or more large capacity tape units and/or disk drives connected to the system through respective control units for storing data. However, a problem exists if one of the storage units fails such that information contained in that unit is no longer available to the system. Generally, such a failure will shut down the entire computer system, which can create a problem for systems which require high availability.

This problem has been overcome to a large extent by the use of Redundant Arrays of Inexpensive Disks (RAID) systems. RAID systems are widely known, and several different levels of RAID architectures exist, including RAID 1 through RAID 5, which are also widely known. A key feature of a RAID system is redundancy, which is achieved through the storage of a data file over several disk drives and parity information stored on one or more drives. While the utilization of a RAID system provides redundancy, having to break a file into several parts, generate parity data, and store the file and parity on the array of disk drives can take a significant amount of time. It is therefore advantageous to have a RAID system that can process the data and generate parity information quickly to provide enhanced performance.

With reference to FIG. 1, a typical RAID system 10 contains a host computer 12, at least one controller 14, and a number of disk drives 16, 17, 18, 19. It should be understood that the number of drives shown in FIG. 1 are for the purpose of discussion only, and that a RAID system may contain more or fewer disk drives than shown in FIG. 1. Data is written to the drives 16, 17, 18, 19 in such a way that if one drive fails, the controller can recover the data written to the array. How this redundancy is accomplished depends upon the level of RAID architecture used, and is well known in the art.

The controller 14 is connected to the host computer 12, which communicates with the controller unit 14 as if it were communicating to a single drive or other storage unit. Thus, the RAID looks like a single drive to the host computer 12. The controller unit 14 receives read and write commands, and performs the appropriate functions required to read and write data to the disk drives 16, 17, 18, 19, depending upon the RAID level of the system. Typically, when the host computer 12 issues a write command, the controller unit 14 receives this command and stores the data to be written in a memory location, and sends a reply to the host computer 12 that the write is complete. Thus, even though the data may not have been written to the disk drives 16, 17, 18, 19, the host computer 12 believes that is has been written. The controller unit 14 then takes appropriate steps to process and store the data on the disk drives 16, 17, 18, 19. It is common for a controller unit 14 to receive several write commands before completing the first write command, in which case the other write commands are placed in to a queue, with the data written for each command as the controller unit 14 works through the queue.

When storing data, generally, the controller 14 receives the data and breaks the data down into blocks which will be stored on the individual disk drives 16, 17, 18, 19. The blocks of data are then arranged to be stored on the drives 16, 17, 18, 19. In arranging the blocks of data, the controller 14 organizes the blocks into stripes and generates a parity block for each stripe. The data blocks are written across several drives, and the parity block for that stripe which is written to one disk drive. In certain cases, the data may not be large enough to fill a complete stripe on the RAID system. This is known as a non-full stripe write. When the data sent to the controller occupies a full stripe, the data is simply written over existing data and the parity is written over the existing parity. Additionally, in certain cases, the controller may aggregate several small writes together to create a full stripe of data, which the controller treats as a fill stripe of data for purposes of generating parity. However, in the case of a non-full stripe write, modifying the stripe of data requires several steps, and is a disk intensive activity.

The occurrence of non-full stripe writes is common in many applications, such as financial, reservation and retail systems, where relatively small data records are widely used and are accessed and modified at random. When an individual customer record needs to be revised, it may reside in a stripe of data that contains several other customer data records. In such a case, only a portion of the stripe needs to be modified, while the remainder of the stripe remains unaffected by the modification of the data.

With reference to FIG. 2, a flow chart representation for completing a non-full stripe write operation is shown. First, shown in block 20, the RAID controller receives new data to be written to the disk array. Next, shown in block 24, the controller reads the old data from the disk array. Then, the controller reads the old parity from the disk array, shown in block 28. The two reads of blocks 24 and 28 may be issued by the controller at the same time, however, they may finish at different times, depending upon several factors, such as other disk activity. Next, shown in block 32, new parity is created by XORing the old data and old parity with the new data. This results in new parity that is generated for the stripe of data. The controller then writes the new data to the disk array, shown in block 36. Finally, the controller writes the new parity to the disk array, shown in block 40. Like the read commands above, the two write commands may be issued by the controller at the same time, although they may finish at different times. When both writes complete, the parity and data are consistent on the disk. When the data has been written but the parity write has not completed, then the parity is not consistent on the disk array. The same is true when the parity has been written but the data write has not completed.

This non-full stripe write process is slow and opens the possibility for data corruption. Normal RAID input and output operations can handle any single failure, but data corruption can occur if there is a double failure. For example, a single failure may be a failure of one hard drive. In such a case, the controller will detect the hard drive failure and operate the RAID system in a critical mode, using the parity drive to generate missing data located on the failed hard drive. Likewise, a single failure may be a controller rebooting, which may occur when all of the data has not been written to the disk drives yet. In this case, the data will still be in the controller non-volatile memory, and when the controller initializes, it will detect the data in memory, compute parity and write the data and parity to insure that the data and parity are valid on the disk drives. If the controller reboots after the data has been written, but prior to the parity being written, the parity for the stripe may be recomputed using the data in that stripe. A double failure is a situation where the controller reboots and then a hard drive fails while the parity and data are not consistent. In such a situation, customer data may be lost, because the controller will not be able to recompute the parity for a stripe due to a disk drive being unavailable. This results in what is termed or defined as the RAID 5 write hole.

One method for closing the RAID 5 write hole, shown in FIG. 3, is to log all outstanding parity writes. In such a case, the controller receives data to be written to the disk array, shown in block 44. The controller next opens a write operation, shown in block 45. The controller then initiates the write operation, shown in block 47. The controller then reads the old data from the disk array, shown in block 48. Next, the controller reads the old parity from the disk array, shown in block 52. As above, the commands for reading the old data and old parity may be issued at the same time, although they may complete at different times. New parity is then computed by XORing the old data and old parity with the new data, shown in block 56. Next, the controller opens a parity log in non-volatile memory showing an outstanding data and parity write, shown in block 60. The parity log contains pointers to the location of the parity data and user data, the location in the drives where the data will be stored, the serial number for the drives being written, the serial number of the array the drives belong to, and an array offset. The controller then writes the new data and new parity to the disk array, shown in block 64. Once the data and parity writes are complete, the controller invalidates the parity log by marking the array offset with an invalid number and terminates the write operation, shown in block 68.

With reference to the dashed lines in FIG. 3, additional steps for data mirroring are now described. Once a write operation is opened, the new data is mirrored to the other controller, shown in block 46. The next mirroring operation occurs following the opening of the parity log, where the controller mirrors the parity and parity log to the other controller, shown in block 62. The next mirroring operation occurs following the data and parity write to the disk array, when a write operation termination command is mirrored to the other controller, shown in block 66

If there is a double failure before the parity log is invalidated, the write commands may be reissued for the data and parity referenced by the parity log. Thus, even in the event of a double failure, the RAID5 write hole is closed. In such a case, the parity log is stored in nonvolatile memory, and removed from nonvolatile memory once the parity log is invalidated. While this method is successful in closing the RAID5 write hole in allowing recovery from a double failure, it is still a disk intensive activity. For each write operation, there are two read commands, and two write commands, one for both the data and the parity for each of the read and write commands. These read and write commands take significant time to complete, and consume channel bandwidth to and from the disk array.

One method for enhancing the performance for non-full stripe writes is to cache the parity. Such a method, shown in FIG. 4, is useful when there are multiple non-full stripe writes to a single stripe. In such a case, the controller receives new data to be written to the disk array and stores the data in temporary nonvolatile memory, shown in block 72. The controller then opens a write operation, which contains a pointer to the location of the new data in temporary memory, shown in block 76. The write operation is placed into a queue, and remains there until any write operations that were before it in the queue are completed. Next, the write operation is initiated, shown in block 80. The controller then reads the old data from the disk array, shown in step 84. The controller then determines whether the old parity is cached, shown in step 88. This determination is made by checking the parity cache in nonvolatile memory for parity which matches with the parity for the stripe of data that was read in block 84. If no parity is present in the parity cache that corresponds with the stripe of data being modified, the controller reads the old parity from the disk array, shown in block 92. If parity is present in the parity cache that corresponds to the stripe of data being modified, the controller reads the old parity from the parity cache, shown in block 96. Once the old parity is read, the controller modifies the parity by XORing the old data and the cached parity with the new data, shown in block 100. The controller then determines whether another write operation in the write operation queue is for the current stripe of data, shown in block 104. If there is not another write operation for the same stripe of data, the controller writes the new data and the new parity to the disk array, shown in block 108. If there is another write operation for the current stripe of data, the controller then caches the new parity in place over the cached parity, if there was a prior parity cache, shown in block 116. The controller then writes the new data to the disk array, shown in block 120. Finally, the controller then terminates the write operation, shown in block 112.

This method enhances the performance of non-full stripe writes by reducing the number of reads and writes of the parity for a particular stripe of data. For example, if there were three write operations for a stripe of data, the parity would be read from the disk array only once, and written to the disk array only once. This decreases the amount of time required to complete the data writes, and also consumes less channel bandwidth as compared to reading the parity from disk and writing the parity to disk for each write operation. However, when caching parity in such a manner, it becomes difficult to log the parity. This is because each parity log is associated with a write operation. When the write operation is terminated, the parity log is also closed. This can happen even though the new parity has not been written to the disk array. If there is a failure of a single hard drive, the controller can write any existing cached parity and the array will become critical. If there is a controller failure, such as a power loss which requires the controller to reboot, the controller can recover by checking the nonvolatile memory for any outstanding write operations and any parity logs. If the controller failure occurs during a write operation, a parity log may still be open. Thus, the controller can recover both the new data, and modify the parity for that stripe of data by reading the old data and old parity, XORing the new data with the old data and old parity, and write both the new data and the new parity.

However, if the controller failure occurs after a write operation is terminated, the parity log will be closed, and when the controller reboots it will not find a parity log. If the parity for that stripe of data was cached, the data and parity on the disks would not be consistent. If all of the disk drives are operating, after recovery the controller will resume normal read and write operations and will re-initiate the write operation which caused the parity to be cached, and normal caching operations would be resumed, thus the inconsistency of the parity and data would not be a problem. A problem can arise, however, if the system has a double failure, such as a controller failure and a hard drive failure. If such a double failure occurs, the system may not be able to correct itself as with a single failure. For example, if the double failure occurred, and the parity for a stripe of data was cached, the data and parity on the disks would not be consistent. Unlike the single failure of a controller situation above, when the write operation that caused the parity to be cached is initiated, the old data may not be able to be read from the disk array without using parity to regenerate a block of data in the stripe. Because the data and parity are inconsistent for that stripe, the data will not be valid. Thus, parity caching may reopen the RAID 5 write hole.

While the method of FIG. 4 is useful to increase performance of a RAID system, it has additional drawbacks. As is well understood, many RAID systems require very high availability. In order to increase availability of a RAID system, redundant controllers are commonly used in such a system. The performance of the system can also be enhanced by having two active controllers, known as an active-active system, which may employ one of a number of zoning techniques where one controller communicates primarily with a set of storage devices or host computers. In such a redundant system, if one controller fails, the remaining controller fails over and assumes control for all of the functions of the failed controller, and the RAID system may continue to operate without interruption. In order to make sure that data is not lost in such a situation, data is mirrored between the two controllers. This mirrored data includes the data that is to be written to the disk array, as well as any outstanding logs which may be present. With reference to the dashed lines of FIG. 4, additional steps for data mirroring are now described. Once a write operation is opened, shown in block 76, the data is mirrored to the other controller, shown in block 78. The next mirroring operation occurs following the computation of new parity in block 100. Once the new parity has been computed, the new parity is mirrored to the other controller, shown in block 102. The final mirroring step occurs following the write of new data to the disk array, and includes a command to the other controller to terminate the write operation, shown in block 110.

If one controller fails, the remaining controller fails over, using the mirrored data, and completes any outstanding write operations using the mirrored data. However, if parity caching is to be used to enhance performance of the RAID system, the prior art method as shown in FIG. 4 will not provide an adequate solution. If a controller fails after the a write operation is terminated, the log associated with the write operation will also be terminated. Therefore, the other controller is not aware that there was a parity cache in the other controller. Thus, if the controller containing the cached parity fails after a write operation has been terminated and parity is cached, the other controller will not recompute the parity for the associated stripe of data. As described above, if there is a single failure the system is able to recover, but in the case of a double failure the system will not be able to recover. Thus, in such instances, there may be an inconsistency between the data and the parity for that stripe. Thus, it would be advantageous to have a high availability redundant system in which both controllers are aware that parity is cached.

SUMMARY OF THE INVENTION

The present invention provides a system and method for parity caching while closing the RAID 5 write hole. The system includes an array of drives that stores data and parity including first data and second data. The system also includes a cache memory, and at least one controller which communicates with the array of drives and the cache memory. The controller controls the storage of the first data as part of a first write operation and controls the storing of first parity information related to the first data. During the first write operation, the controller also controls whether the first parity is written to disk or stored in the cache memory during the first write operation. The controller also controls providing a parity log related to the first data before writing the first data to disk. When the first parity is written to cache memory, the controller controls providing a parity log related to the second write operation before starting the second write operation and before terminating the first write operation. This parity log contains a pointer to the cached parity. The parity log related to the second data is provided before invalidating the parity log related to the first data. The controller controls invalidating the parity log related to the second data after completion of a data write associated with the second write operation. In one embodiment, the controller controls starting the second write operation with the reading of previously stored data, and after receiving the second data that is to be written to the array of drives. In another embodiment, the second write operation starts when a continuous, uninterrupted sequence of steps begins which results in the second data being written to the array of drives. In another embodiment, the second write operation starts at least before the modification of previously stored parity (e.g., first parity) begins to create second parity.

The method for parity caching includes storing first data on the array of drives as part of a first write operation. During the first write operation, the controller reads the existing data and parity from a first stripe of data on the array of drives. The controller then modifies the parity to provide first parity and opens a parity log associated with the first write operation. The first parity is received in non-volatile cache memory associated with the controller. The controller then determines if a second write operation, which follows the first write operation, is for the same stripe of data. If the second write operation is for the same stripe of data, the controller stores the first data on the array of disks and opens a parity log associated with the second write operation. The controller then invalidates the parity log associated with the first write operation and terminates the first write operation.

The controller then stores second data to the array of drives as part of a second write operation. During the second write operation, the controller reads the existing data from the array of disks, and the first parity from the cache memory. The controller computes the parity, and the first parity is replaced in the cache memory with second parity. The controller then checks to verify that a third write operation is for the same stripe of data, and if so caches the second parity and opens a parity log for the third write operation. If the third write operation is for a different stripe of data, the second write operation writes the second parity to the array of disks and invalidates the parity log associated with the second write operation.

In the event of a double failure associated with a controller and one of the drives in the array of drives, a recovery is performed using the parity log. In one embodiment, the recovery is by a second controller which accesses the parity log and determines the second parity using the parity log. In another embodiment, the second controller obtains the cached parity from a cache memory associated with the second controller.

DETAILED DESCRIPTION

Figure 1:
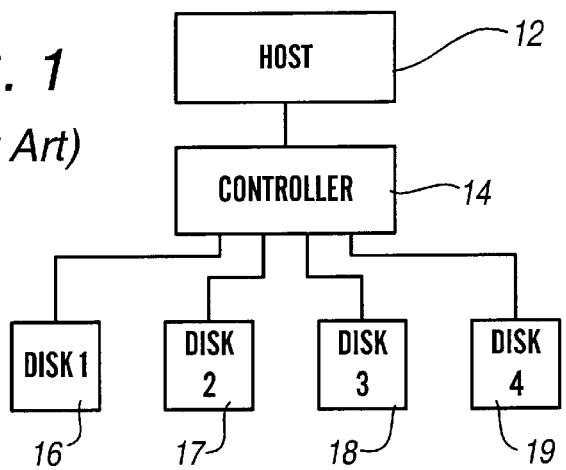
FIG. 1 is a block diagram representation of a RAID system.
Figure 2:
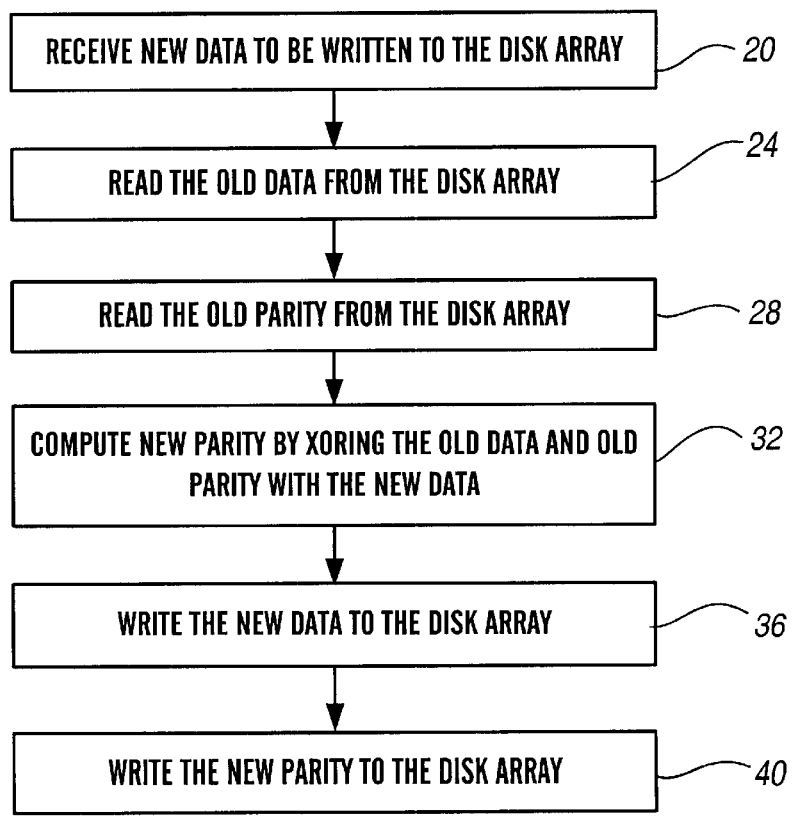
FIG. 2 is a flow chart representing the steps for the modification of a stripe of data in a RAID system.
Figure 3:
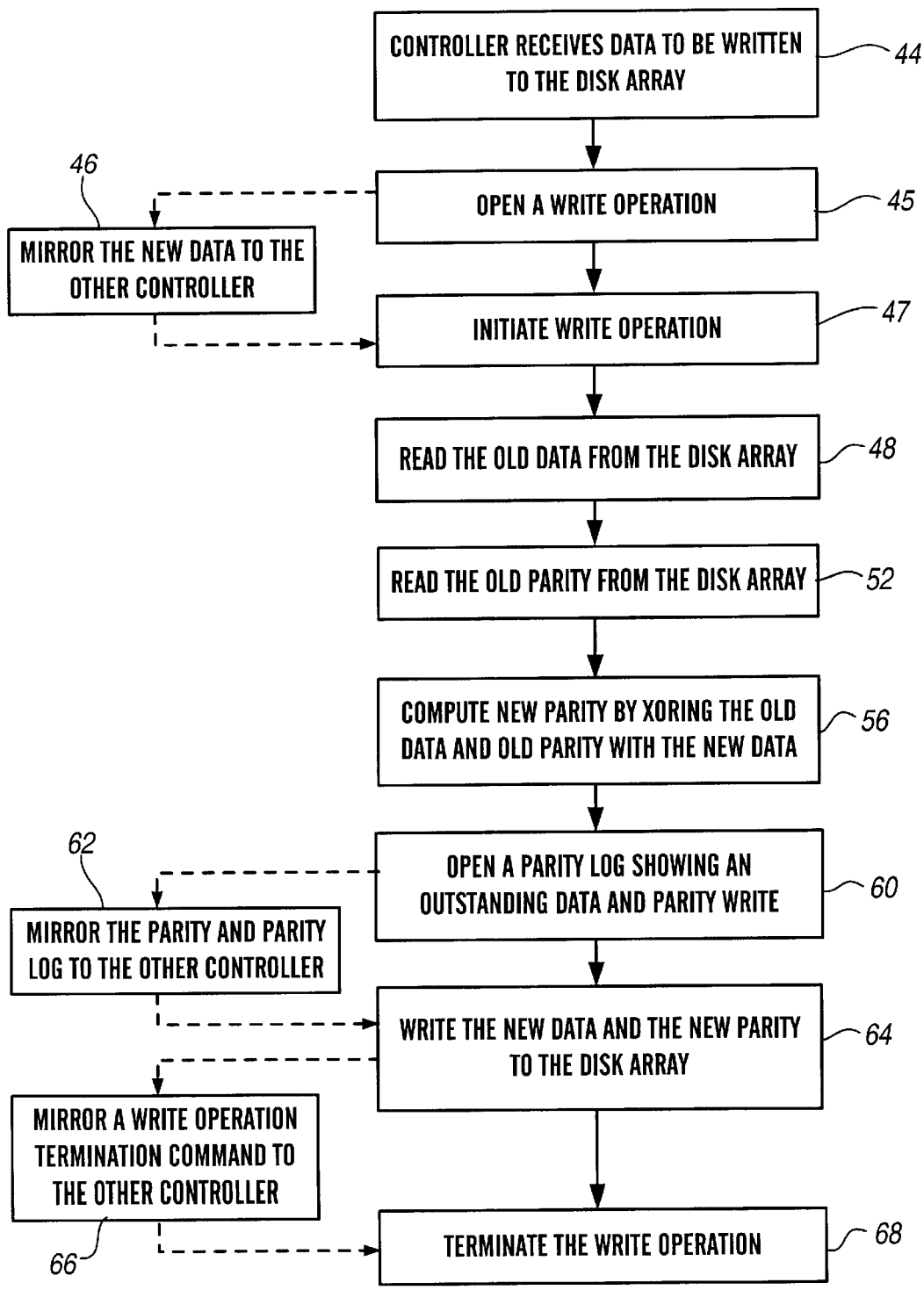
FIG. 3 is a flow chart representing the steps for the modification of a stripe of data in a RAID system which utilizes parity logging.
Figure 4:
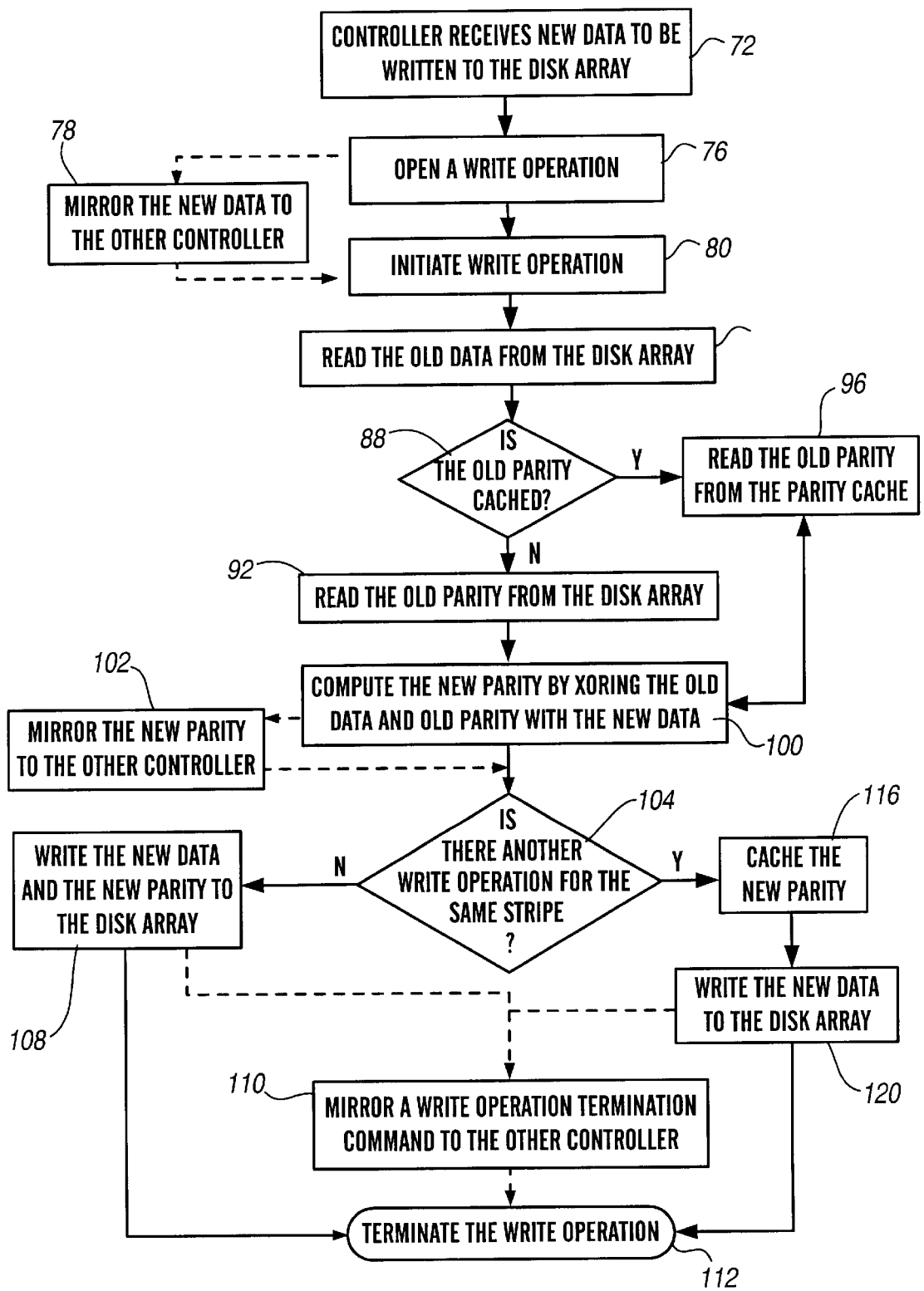
FIG. 4 is a flow chart representing the steps for the modification of a stripe of data in a RAID system which utilizes parity caching.
Figure 5:
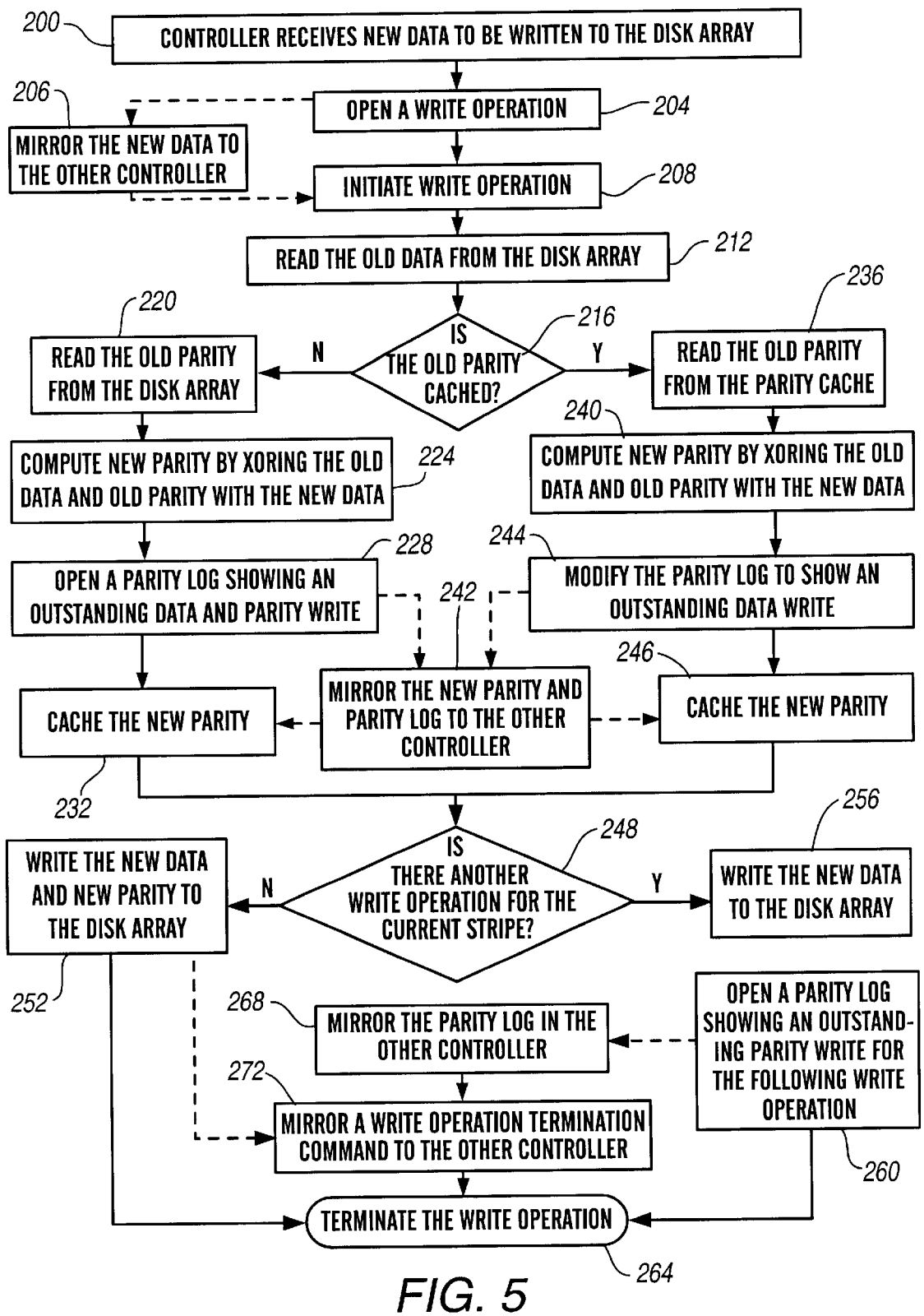
FIG. 5 is a flow chart representing the steps for the modification of a stripe of data in a RAID system which utilizes parity caching and parity logging.

With reference now to FIG. 5, a flow chart for closing the RAID5 write hole while utilizing both parity caching and parity logging is shown. First, the controller receives new data to be written to the disk array and stores the data in temporary nonvolatile memory, as shown in block 200. The controller then opens a write operation, which contains a pointer to the location of the new data, shown in block 204. In one embodiment, there are 400 available write operations in the controller. Each available write operation has an area in non-volatile memory that is associated with the write operation. This memory area is available to store information needed for the write operation, such as the pointer to the location of the new data, as well as any logs that are associated with the write operation. When the controller receives data to be written from the host computer, it locates an available write operation, and opens this write operation. Once the write operation is open, the controller communicates to the host computer that the write is complete.

The write operation is placed into a queue, and remains there until any write operations that were pending in the queue are complete. Once the write operation is at the top of the queue, the controller initiates the write operation, shown in block 208. The controller then issues a read command to read the old data from the disk array, shown in block 212. The controller then determines whether the old parity is cached, shown in block 216. If the old parity is not cached, the controller issues a read command to read the parity from the disk array, shown in block 220. New parity is then computed by XORing the old data and old parity with the new data, shown in block 224. The controller then opens a parity log showing an outstanding data and parity write, shown in block 228. The controller then caches the new parity, as is shown in block 232.

If the old parity is cached, the controller reads the old parity from the parity cache, shown in block 236. The controller then computes new parity by XORing the old data and old parity with the new data, shown in block 240. The controller then modifies the parity log to show an outstanding data write in addition to the outstanding parity write, shown in block 244. The controller then caches the new parity, shown in block 232, overwriting the previously cached parity.

The controller then determines whether there is another write operation for the current stripe of data, shown in block 248. If there are no other write operations for the current stripe, the controller issues a write command to write the new data and new parity to the disk array, shown in block 252. If there is another write operation for the current stripe, the controller issues a write command to write the new data to the disk array, shown in block 256. The controller then opens a parity log showing an outstanding parity write for the following write operation which needs to write to that stripe of data, shown in block 260. Finally, the controller invalidates the current write operation parity log, and terminates the current write operation, as is shown in block 264.

As can be seen, if a first write operation determines that the following write operation in the queue is for the same stripe of data, the first write operation operates to open a parity log for the following write operation. This way, the second write operation in such a situation has a parity log opened to show an outstanding parity write prior to the second write operation being started. In one embodiment, the second write operation is considered to be started when the old data is read from the disk array. In another embodiment, the second write operation is considered to be started when a continuous, uninterrupted chain of events begins which leads to the new data being written to the disk array. In still another, more preferred embodiment, the second write operation is considered to be started at a point prior to the modification of parity in the second write operation.

Thus, if there is a failure at any point in the sequence, there will be a parity log active when there is cached parity which has not yet been written to disk, and the RAID 5 write hole is closed. The parity log may have entries for both an outstanding data write and an outstanding parity write. If there is a failure between two write operations for the same stripe of data, there may be an active parity log for the second write I/O which shows an outstanding parity write. The controller uses this to determine that the data on the RAID array for that stripe is valid, and that the parity for that data stripe is not valid. The controller can recover the parity from the parity cache and write it to the disk array, thereby correcting any inconsistency between the data and the parity. If the failure occurs when the parity log shows both an outstanding data and parity write, the controller can determine that the data and the parity for that stripe of data are not valid. The controller can then repeat the write operation to recover the data and the parity and remove any inconsistency between the data and the parity.

Additionally, there can be a period of time where two parity logs may be open at the same time. This situation can occur if the following write operation is for the same stripe of data as the current write operation. Before the current write operation is terminated and its parity log invalidated, a parity log for the following write operation is opened. If a failure occurs during the period before the current parity log is invalidated and after the second parity log is opened, the new parity would be written twice, once for the current write operation, when the data and parity would be written to the disk array, and once for the following write operation. The following write operation would not show an outstanding data write, thus there is no risk of inconsistent data and parity.

In one embodiment, the controller determines whether there is another write operation for the same stripe by checking the status of a pointer within the write operation. If there is another write operation for the same stripe of data, the pointer within the current write operation will indicate the number of the next write operation. The controller uses this information to determine if there is another write operation for the same stripe, and open a parity log for that write operation showing an outstanding parity write. Thus the area in non-volatile memory that is associated with the second write operation will contain both the data for that write operation as well as an open parity log. Likewise, if there are no other write operations for the same stripe of data, the pointer will indicate the number of the current write operation indicating to the current write operation that the parity needs to be written to the disk array.

The method shown in FIG. 5 also provides an active-active solution. With reference to the dashed lines of FIG. 5, additional steps for data mirroring are now described. Once a write operation is opened in block 204, the new data is mirrored to the other controller, shown in block 206. The next mirroring step occurs following the opening of a parity log in block 228, or following the modification of the parity log in block 244, when the new parity and parity log is mirrored to the other controller, shown in block 242. If there is another write operation for the current stripe, following the opening of a parity log for the following write operation in block 260, the log is mirrored to the other controller, shown in block 268. The other controller is then given a command to terminate the write operation, shown in block 272. If there is not another write operation for the current stripe, following the write of the new data and new parity in block 252, the other controller is given a command to terminate the write operation shown in block 272. When a RAID system is acting in an active-active redundant mode, the data and logs are mirrored between the two controllers. By having an active parity log at all times, both controllers have a record of all outstanding data and parity writes. Therefore, if one controller has a failure while a parity write is outstanding, the other controller can read the parity for that stripe and write the parity, thus avoiding any inconsistency between the data and the parity. If one controller fails while both a data and a parity write are outstanding, the other controller is aware of this situation, and can read the data and parity from the disk array, compute new parity using the mirrored copy of the new data, and write the new data and new parity to the disk array, avoiding any inconsistency between the data and parity on the disk array.

The following is an example of a portion of a write operation which implements one embodiment of the invention:

```
struct buf
{
    dev_t    b_dev;      /* Device associated with buffer. */
    U32      b_blkno;    /* Underlying physical block number. */
    U32      b_bcount;   /* Valid bytes in buffer. */
    long     b_flags;    /* B_* flags. */
    TAILQ_HEAD(sglist, _io_sgmap) b_sghead; /* Head of scatter/gather list. */
    void     (*b_iodone)(struct buf *); /* Function to call upon completion. */
    unsigned char  b_error;       /* Errno value. */
    unsigned char  b_sgcnt;       /* Number of entries in scatter/gather list. */
    unsigned char  b_ios_total;   /* For private use by storage drivers */
    unsigned char  b_ios_complete; /* For private use by storage drivers */
    struct buf*ct_parent;         /* addres of original bufcache buf. */
    short    ct_chunksize;        /* chunk size in sectors */
    struct buf*ct_leftlink;       /* RAID5 hash and lock links */
    struct buf*ct_rightlink;
};
```

In this embodiment, b_dev is the array number or the disk drive this operation is sent to depending on who owns it.

b_blkno is the starting lba number for this operation.

b_bcount is the number of bytes of data associated with this operation.

b_flags determines whether this operation is a read or a write.

b_sghead is the head of the scatter gather list for this operation.

b_iodone is the call back function to call when this operation is complete.

b_error is a descriptor of the error that happened while processing this operation.

b_sgcnt is the number of scatter gather elements in this scatter gather list.

b_ios_total is the number of sub operations associated with this operation.

b_ios_complete is the number of sub operations that completed.

ct_parent is a pointer to the parent operation associated with this operation.

ct_chunksize is the chunksize in lbas for this array.

ct_leftlink is a pointer to an earlier operation that is to the same stripe.

ct_rightlink is a pointer to a later operation that is to the same stripe. rightlink is used by the current write operation to determine if there are any other operations that want to use the parity cache. If rightlink points to the current write operation, then there is no other operation to pass the parity log to, and the cached parity is written to disk. If rightlink contains information on the number of the following write operation, a parity log is opened for that write operation and the cached parity is not written to disk.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the inventions and to enable others skilled in the art to utilize the inventions in such, or in other embodiments, and with the various modifications required by their particular application or uses of the invention. It is intended that the appended claims be construed to include alternative embodiments to the extent permitted by the prior art.

What is claimed is:

1. A method for parity caching, comprising:

storing firstly first data to an array of drives using at least a first controller as part of a first write operation;

receiving first parity in non-volatile cache memory associated with said first controller as part of said first write operation;

storing secondly second data to said array of drives using said first controller as part of a second write operation;

providing a parity log related to said second data before starting said second write operation;

experiencing a double failure associated with said first controller and one of said array of drives after said providing step and before said starting of said second write operation; and accessing said parity log to determine a location of said first parity to recover from said double failure.

2. A method, as claimed in claim 1, further including:

replacing said first parity with second parity in said cache memory.

3. A method, as claimed in claim 2, further including:

transferring parity from said cache memory to said array of drives sometime after said second write operation; and performing a third write operation before said transferring step and in which said parity transferred during said transferring step is different from said second parity.

4. A method, as claimed in claim 1, wherein:

said first write operation is a non-full stripe write to a first stripe of said array of drives.

5. A method, as claimed in claim 4, wherein:

said second write operation is a non-full stripe write to said first stripe and with said second write operation being performed before any other write operation after said first write operation to said first stripe.

6. A method, as claimed in claim 1, wherein said storing firstly step includes:

obtaining existing data from at least portions of a first stripe of said array of drives;

reading existing parity from said array of drives into said cache memory;

changing said existing parity in said cache memory to provide said first parity; and writing said first data to said array of drives and not writing said first parity to said array of drives while maintaining said first parity in said cache memory.

7. A method, as claimed in claim 6, further including:

mirroring said first parity to a second controller.

8. A method, as claimed in claim 1, wherein:

said accessing step includes having a second controller access said parity log and determining said first parity using said parity log.

9. A method, as claimed in claim 8, wherein:

said second controller accesses said parity log before any caching can occur of second parity to said cache memory.

10. A method, as claimed in claim 8, wherein:

said step of determining said first parity includes obtaining said first parity from cache memory associated with said second controller.

11. A method, as claimed in claim 2, further including:

invalidating said parity log some time after said replacing step.

12. A method, as claimed in claim 11, wherein:

said invalidating step is conducted before said second write operation is terminated.

13. A method, as claimed in claim 11, wherein:

said invalidating step is conducted after opening another parity log for a third write operation.

14. A method, as claimed in claim 1, wherein:

said providing step is conducted in said cache memory associated with said first controller.

15. A method, as claimed in claim 1, wherein:

said starting said second write operation begins with reading previously stored data from said array of drives.

16. A method, as claimed in claim 1, wherein:

said starting said second write operation begins with a continuous, uninterrupted sequence of steps that results in said second data being written to said array of drives.

17. A method, as claimed in claim 2, wherein:

said starting said second write operation begins at least before said replacing step.

18. A method, as claimed in claim 1, wherein:

said parity log is obtained before termination of said first write operation and said starting said second write operation.

19. A system for parity caching, comprising:

an array of drives that stores data and parity including first data and second data;

at least a first cache memory; and at least a first controller communicating with said array of drives and said first cache memory, said first controller performing the following related to a first write operation involving said first data and a second write operation involving said second data:

controlling storing of said first data as part of said first write operation to said array of drives;

controlling storing of first parity associated with said first data in said first cache memory, wherein said first parity is not written to said array of drives at completion of said first write operation and, at completion of said first write operation, said first data is stored with said array of drives and said first parity remains stored in said cache memory; and controlling providing a parity log related to Said second data before starting said second write operation, said parity log including information indicating a location of said first parity in said first cache memory and wherein, when a double failure occurs with said first controller and one of said array of drives after said parity log is provided and before said second write operation is started, said parity log is accessed to determine said location of said first parity to recover from the double failure.

20. A system, as claimed in claim 19, wherein:

said controller controls providing a parity log related to said first data and in which said parity log related to said second data is provided before invalidating said parity log related to said first data.

21. A system, as claimed in claim 19, wherein:

said controller controls invalidating said parity log related to said second data some time after said starting said second write operation.

22. A system, as claimed in claim 19, wherein:

said starting said second write operation begins with reading previously stored data after receiving said second data that is to be written to said array of drives.

23. A system, as claimed in claim 19, further including:

a second controller involved with recovering from a double failure associated with said first controller and one of said array of drives using said parity log related to said second data.

24. A system, as claimed in claim 19, further including:

a second controller to which said first parity and said parity log is mirrored.

* * * * *